United States Patent
Lagerman

(10) Patent No.: US 9,167,503 B2
(45) Date of Patent: Oct. 20, 2015

(54) METHOD AND A DEVICE FOR GAINING AND MAINTAINING CONTROL OF THE TRAFFIC FROM A RADIO BASE STATION IN A CELLULAR TELEPHONY SYSTEM

(75) Inventor: Mikael Lagerman, Göteborg (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 1548 days.

(21) Appl. No.: 13/056,182

(22) PCT Filed: May 22, 2006

(86) PCT No.: PCT/SE2006/000594
§ 371 (c)(1),
(2), (4) Date: Jan. 27, 2011

(87) PCT Pub. No.: WO2007/136309
PCT Pub. Date: Nov. 29, 2007

(65) Prior Publication Data
US 2011/0164603 A1    Jul. 7, 2011

(51) Int. Cl.
H04W 48/02    (2009.01)
H04W 24/02    (2009.01)

(52) U.S. Cl.
CPC .............. *H04W 48/02* (2013.01); *H04W 24/02* (2013.01)

(58) Field of Classification Search
CPC .............................. H04W 24/02; H04W 48/02
USPC ......... 370/331–347, 226, 243, 246, 293, 279, 370/274, 315, 316, 492, 501; 455/7, 11, 1, 455/13, 16
See application file for complete search history.

(56) References Cited

U.S. PATENT DOCUMENTS 6,590,879 B1 * 7/2003 Huang et al. ................... 370/331
6,597,671 B1 * 7/2003 Ahmadi et al. ................ 370/329
(Continued)

FOREIGN PATENT DOCUMENTS

EP    1 051 053 A2    11/2000
GB    2294181 A    4/1996
(Continued)

OTHER PUBLICATIONS

Meyer, U., et al. "On the Impact of GSM Encryption and Man-In-The-Middle Attacks on the Security of Interoperating GSM/UMTS Networks", Personal, Indoor and Mobile Radio Communications (PIMRC), Publication Date: Sep. 5-8, 2004, vol. 4, pp. 2876-2883.
(Continued)

*Primary Examiner* — Andrew Lai
*Assistant Examiner* — M Mostazir Rahman

(57) ABSTRACT

A method for letting a temporary radio base station (RBS, 140) gain and maintain control of the traffic of a targeted RBS (120) in a system (100), where RBS's transmit an identity signal and a list of candidate frequencies for use by user terminals when switching RBS. The temporary RBS (140) is positioned in or adjacent to the targeted RBS (120), and transmits on a frequency in the candidate list of the targeted RBS (120). The transmissions are at such a power level that the traffic of the targeted RBS (120) is transferred to the temporary RBS (140). The temporary RBS transmits the identity signal the RBS whose frequency the temporary RBS transmits on, and transmits a list of candidate frequencies such that user terminals whose traffic has been transferred to the temporary RBS cannot find signals with sufficient strength on any of the candidate frequencies.

17 Claims, 5 Drawing Sheets

(56) References Cited

U.S. PATENT DOCUMENTS

| | | | |
|---|---|---|---|
| 6,747,965 B1* | 6/2004 | Nara et al. | 370/335 |
| 7,039,425 B1 | 5/2006 | Mazawa et al. | |
| 7,236,464 B2* | 6/2007 | Walker et al. | 370/295 |
| 7,796,568 B2* | 9/2010 | Tynderfeldt et al. | 455/436 |
| 2002/0041584 A1* | 4/2002 | Sashihara | 370/337 |
| 2002/0119769 A1* | 8/2002 | Heinonen et al. | 455/422 |
| 2002/0173275 A1* | 11/2002 | Coutant | 455/67.1 |
| 2005/0047369 A1* | 3/2005 | Pecen et al. | 370/331 |
| 2005/0239482 A1 | 10/2005 | Fan et al. | |
| 2006/0089141 A1* | 4/2006 | Ho et al. | 455/436 |
| 2008/0020749 A1* | 1/2008 | Delaveau et al. | 455/423 |
| 2009/0186618 A1* | 7/2009 | Lagerman | 455/445 |
| 2011/0182243 A1* | 7/2011 | Gallagher et al. | 370/328 |
| 2013/0122803 A1* | 5/2013 | Forster | 455/11.1 |

FOREIGN PATENT DOCUMENTS

| | | |
|---|---|---|
| JP | 10-327474 | 12/1998 |
| JP | 2000-152308 A | 5/2000 |
| WO | WO 96/10893 | 4/1996 |
| WO | WO 03/103184 A1 | 12/2003 |
| WO | WO 2006/043131 A1 | 4/2006 |

OTHER PUBLICATIONS

English translation of the Office Action dated May 31, 2011, Japanese patent application No. 2009-511977, pp. 1-4.
English translation of the Office Action dated Oct. 25, 2011, Japanese patent application No. 2009-511977, pp. 1-3.
Supplementary European Search Report, European Patent Application No. EP 06747798.4, dated Nov. 23, 2011, pp. 1-2.

* cited by examiner

METHOD AND A DEVICE FOR GAINING AND MAINTAINING CONTROL OF THE TRAFFIC FROM A RADIO BASE STATION IN A CELLULAR TELEPHONY SYSTEM

TECHNICAL FIELD

The present invention relates to a method and a device for letting a temporary radio base station gain and maintain control of traffic to and from a targeted radio base station in a wireless cellular telecommunications system. In the system in question, there are a number of radio base stations for controlling and routing traffic to and from user terminals in the system, and each radio base station routes and controls the traffic to and from a certain cell within the system.

BACKGROUND

Many situations can be envisioned in which it is desirable for government bodies such as law enforcement agencies to prevent the use of cellular telephones within a certain geographical area. For example, during a situation of civil unrest such as riots, it may be desirable for the police or other similar government bodies to prevent the function of cellular telephones within a certain section of a city.

Other cases where it may also be desirable to prevent the function of cellular networks in a defined geographical area might be, for example, before a police raid on a building. Another example of a problem area which could be addressed by area-selective prevention of cellular telephony is cellular telephones which have been smuggled into prisons, which is beginning to constitute a major problem.

Traditionally, the prevention of cellular telephony within an area has been approached much in the same manner as traditional electronic warfare. This means that traditional solutions have been used which are mainly aimed at transmitting a jamming signal, usually noise, on the relevant frequencies, so as to "drown" the information in noise, and to thus create a signal-to-noise ratio which prevents the user terminals in the targeted area from detecting the "payload" signal.

A problem with the technique described above, i.e. so called "brute force" jamming, is that this is a method which consumes a great deal of energy, thus making the equipment heavy and not very portable. In addition, since noise signals are transmitted with a relatively high output power at well known frequencies, it can be quite easy for a skilled user to detect that the system is being tampered with.

Document FR 2 858 742 describes a procedure and a device for tampering with cellular communications which addresses some of the problems described above. However, the device appears to need a great deal of processor power, since it relies on a rather complex algorithm, and tries to identify certain signals on a more or less constant basis.

SUMMARY

There is thus a need for a method and a device by means of which control can be gained of the cellular traffic in a certain area, without creating a large need for processor capacity and transmitter power. In addition, control of the traffic must not only be gained, but also maintained. The traffic which it is desired to gain and maintain control of is that between the user terminals in a certain area and the radio base station (RBS) or stations which their traffic is controlled by and routed via.

This need is met by the present invention in that it provides a method for letting a temporary radio base station gain and maintain control of the traffic to and from a targeted radio base station in a wireless cellular telecommunications system, where the system comprises a number of radio base station for routing traffic to and from user terminals in the system.

Each radio base station in such a system controls the traffic to and from a certain cell within the system, and at least a number of the radio base stations in the system each transmits an identity signal and a list of candidate frequencies for use by user terminals when switching to another radio base station.

The phrase "switching to another base station" refers to the fact that the user terminals in a cellular system will have their traffic controlled by and routed via a radio base station which fulfils certain criteria, among them signal strength. When the signal strength from the current radio base station falls below a certain pre-defined level for a certain pre-defined amount of time, a transfer of the traffic is made to another radio base station from which a clearer signal is received by the user terminal.

According to the invention, control of the traffic to and from the targeted radio base station is gained by positioning the temporary radio base station in or adjacent to the cell of the targeted radio base station, and programming the temporary radio base station to transmit on one of the frequencies in the candidate list broadcast by the targeted radio base station.

Suitably but not necessarily, the frequency on which the temporary RBS is programmed to transmit on is a frequency used by an RBS which is not immediately adjacent to the cell of the targeted RBS.

Thus, the temporary radio base station is made to transmit on a frequency which is monitored by the user terminals in the area in question, and with a power level which ensures transfer of the user terminal (-s) to the temporary radio base station from the targeted radio base station. In addition, the temporary radio base station is made to transmit as its identity signal a signal which is the same as the identity signal of the radio base station on whose frequency the temporary radio base station transmits on. Hence, control of the traffic of the targeted radio base station will be acquired by the temporary radio base station.

In order to let the temporary radio base station not only gain but also maintain control of the traffic of the targeted radio base station, the temporary radio base station is programmed to transmit a list of candidate frequencies, but with the list being such that the user terminals cannot find signals with sufficient strength on any of the candidate frequencies in the vicinity of the take-over area. Accordingly, control of traffic which has been transferred to the temporary radio base station will also be maintained by it.

In a preferred embodiment of the invention, the list of candidate frequencies is made empty, which will mean that the candidate frequencies cannot be found by the radio base stations of which control has been gained, since the user terminals will in fact not look for candidate frequencies.

The method of the invention can be applied to a number of cellular telephony systems, among which can be mentioned TDMA systems such as the GSM system, or to CDMA systems.

If the invention is applied to a GSM system, the identity signal which will be used is the so called CGI-signal, or the BSIC signal (BSIC: Base Station Identity Code), and the list of candidate frequencies will be the so called BA list. (BA: BCCH Allocation, where BCCH stands for Broadcast Control Channel.)

Also, as opposed to prior art, no advanced algorithms or large amounts of processor power are needed in order to obtain the goals of the invention. In addition, the temporary base station of the invention can achieve the desired objectives in a much more energy efficient manner, which makes it possible to design a smaller and more compact device than previously, which can conceivably be battery powered. Also, as opposed to traditional jammers, which have used the "brute force" approach, the device of the invention does not cause as much interfering noise in the system.

BRIEF DESCRIPTION OF THE DRAWINGS

The invention will be described in more detail in the following, with reference to the appended drawings, in which.

DETAILED DESCRIPTION

In the following, the invention will be described in closer detail, and use will be made of some examples of a cellular system in order to illustrate the inventive concept. The examples will mainly show the invention applied to a generic GSM system, in other words a system which is based on the TDMA principle, Time Division Multiple Access. However, it should be pointed out, and will be realized by those skilled in the art, that the invention can equally well be applied to cellular systems which are based on other principles, such as, for example, CDMA, Code Division Multiple Access.

Figure 1:
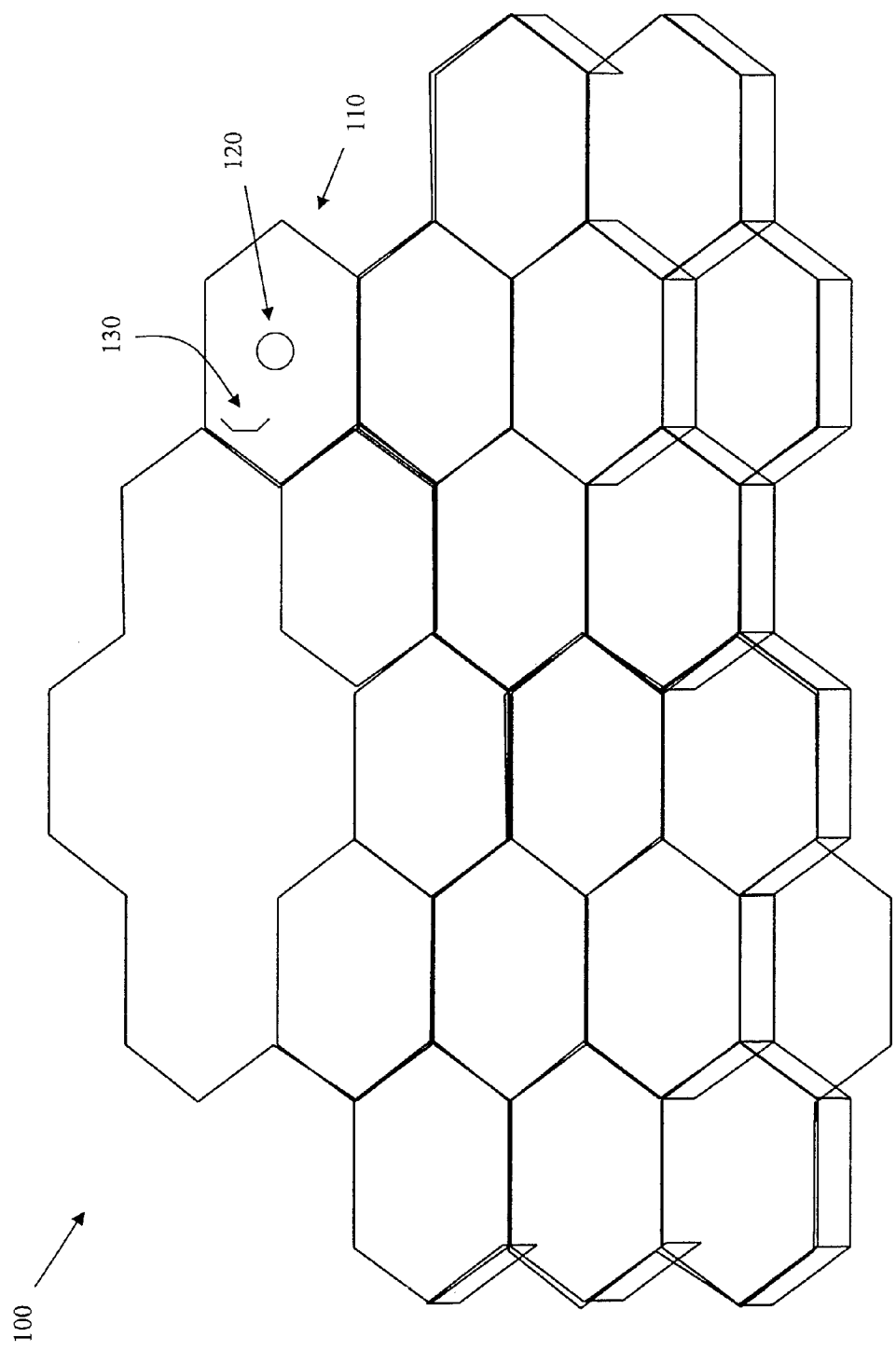
FIG. 1 shows a part of a cellular system in which the invention may be applied.

Before the inventive concept is described, a brief description needs to be made of some functions in a cellular telephony system:

FIG. 1 shows the general layout of a wireless cellular system 100, or at least a part of such a system. As indicated in FIG. 1, the system comprises a plurality of separate and neighbouring geographical areas, so called "cells", exemplified by the cell denoted as 110. Within each cell there is usually one radio base station ("RBS") 120 which controls all traffic to and from user terminals 130 in the cell, and via which all traffic to and from the user terminals 130 in the cell 120 is routed. The user terminals in the system continuously monitor the quality of the received signal from the RBS which routes and controls their traffic, in order to determine when their traffic should instead be controlled by and routed via another RBS, in other words if a so called "hand-over" to another RBS should be performed.

The signal quality as well as certain other predefined parameters are used when deciding if a hand-over should be made. The decision of making a hand-over can be made either by the user terminal 130 or by a so called Base Station Controller (BSC) at system level. Usually, the decision is made by a control function or control means in the user terminal if the user terminal is not engaged in an active session, i.e. when the terminal is in the so called "idle mode", and by the BSC if the user terminal is in the so called "active mode", i.e. there is a voice or data session in progress. In the latter case, i.e. during active mode, the user terminal reports the relevant data to the BSC, which will then decide if and when a hand-over should be made.

Each cell in the system 100 has a globally unique identity within the system, in some systems such as GSM referred to as the CGI, the Cell Global Identity, which usually consists of 15 to 18 bytes. Since the CGI comprises such a rather large number of bits, a shorter identity is often used by the radio base station in the cell, the shorter identity being referred to as the BSIC, Base Station Identity Code.

The BSIC or the CGI are broadcast at frequent intervals by the radio base station 120 in the cell 110, so that the cell and its radio base station may be identified by the user terminals 130. The BSIC and/or the CGI are broadcast by the radio base stations on a special channel, usually a special logical channel. Also included in this broadcast is the so called BA list, which is a list of frequencies used by radio base stations in the neighbourhood of the broadcasting radio base station.

With reference to FIG. 1 and the cell 110, the BA list is thus used by the user terminals 130 in the cell 110 in order to know which other frequencies should be monitored for signal quality and possibly used in hand-over.

In the case of the "passive mode", a hand-over will roughly take place as follows: a user terminal 130 in the cell 110 will listen to the broadcast message from the radio base station in the cell 110, and will monitor the frequencies in the BA list to see if they provide a better signal quality than the radio base station in the cell 110. If the answer is affirmative, and certain other criteria are fulfilled, such as for example the duration of the signal quality, the user terminal 130 switches its traffic to the radio base station with the better quality, and then starts to monitor the BA list of that radio base station.

Figure 2:
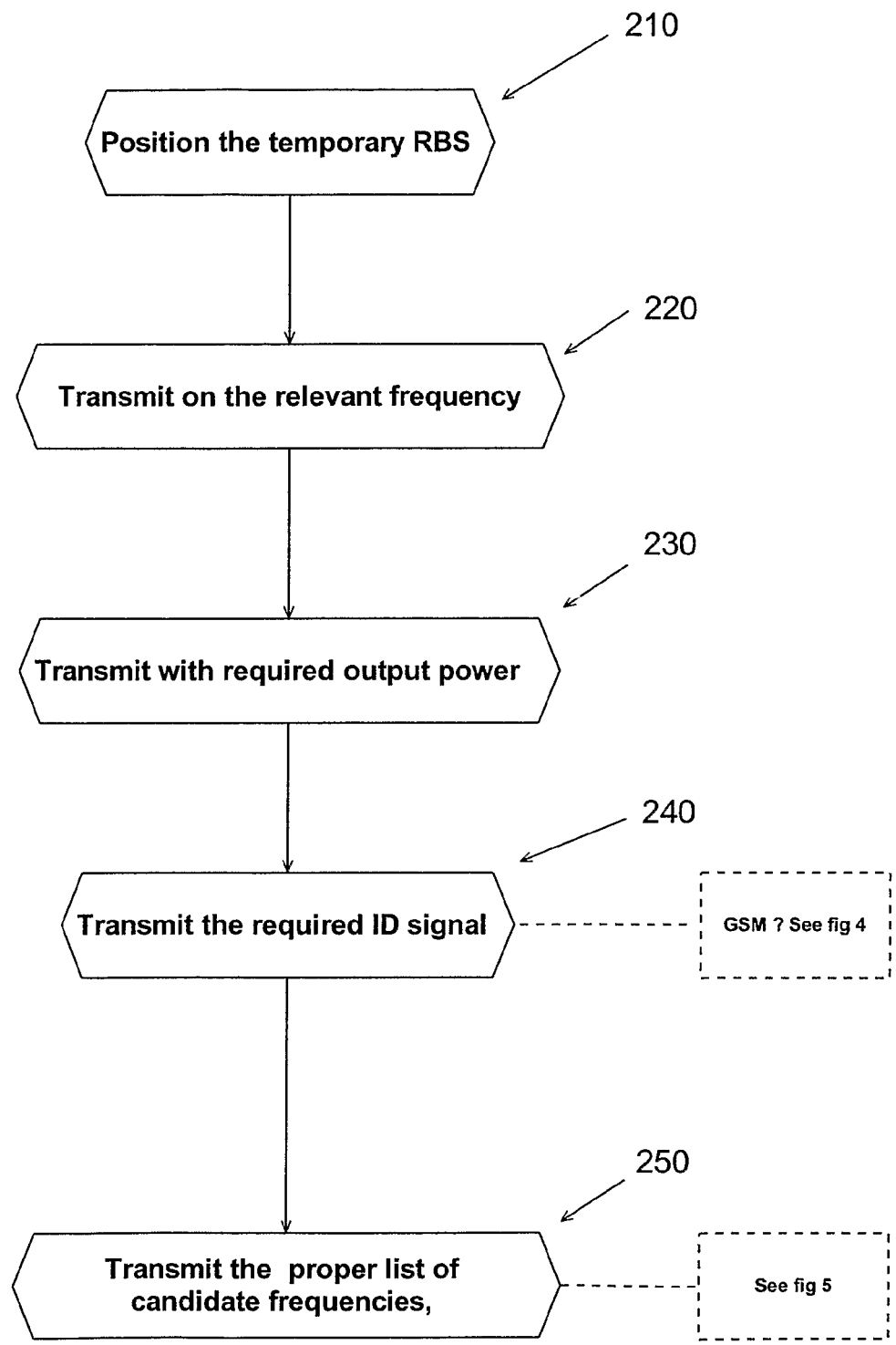
FIG. 2 shows a flowchart outlining some major steps of a method according to the invention.

With reference to FIG. 1 and also to the flowchart in FIG. 2, an example of a method according to the invention will be shown. Imagine an area in which it is desired that no cellular telephony should be able to take place, for example a known hideout for criminals, which the police have decided to raid. It would be highly valuable to the police if no cellular calls could be made to or from the vicinity of the building prior to and during the raid. Control of all cellular telephony in the area in question is carried out by a regular RBS in the system, which RBS will thus be "targeted" for takeover of its traffic.

In short, which will be elaborated upon later in this text, a method according to the invention utilizes an extra RBS, from now on referred to as a temporary RBS, in order to gain control of the traffic of the targeted RBS.

In order to utilize the invention optimally, it is necessary to determine which frequencies that are in the candidate list, i.e. in a GSM system the BA list, of the targeted radio base station. This information can be obtained in a variety of ways, for example from the operator or operators of the cellular systems in that area, or by measurements carried out in the area in which it is desired to gain and maintain control of the traffic.

In addition to this, it is necessary to obtain the identity code of the station whose frequency the temporary radio base station will transmit on. This information can also be obtained either by measurements in the field, or from the operator of the system.

It is also suitable to find out what the signal level is for the user terminals in the area in question, since it is desired for the temporary RBS to transmit with an output power level that makes the user terminals in the area to want to switch their traffic to the temporary RBS, but as an alternative this can be done by simply transmitting with an output level which it is a priori known that the targeted RBS cannot match.

When the information which was described above has been obtained, it is used in the temporary RBS in the following way:

The temporary RBS is positioned in the cell of the targeted RBS, or adjacent to said cell, see block 210 of FIG. 2.

The temporary RBS is made to transmit on one of the frequencies in the candidate list of the targeted RBS, said frequency being used by an RBS which is suitably not immediately adjacent to the cell of the targeted RBS, see block 220 of FIG. 2.

The transmissions on said control frequency are made with such an output power level that user terminals within a certain area will perceive the signal from the temporary RBS as a signal of better quality than the targeted RBS, and will accordingly want to switch their traffic to the temporary RBS, see block 230 of FIG. 2.

The temporary RBS transmits on its control channel an identity which is the same as that of the RBS whose control frequency is used, see block 240 of FIG. 2.

Thus, by means of the steps outlined above, user terminals within a certain area will perceive a signal which is stronger than that of the targeted RBS, and since the received signal is one of those on the candidate list of the targeted RBS, they will perceive it as a regular "competing" signal, and will switch their traffic to the temporary RBS. When and if the BSC is notified of the measured signal strength by the user terminals, it will order them to switch their traffic to the temporary RBS for the same reason, i.e. that the temporary RBS will be perceived as an ordinary candidate for "handover".

Figure 3:
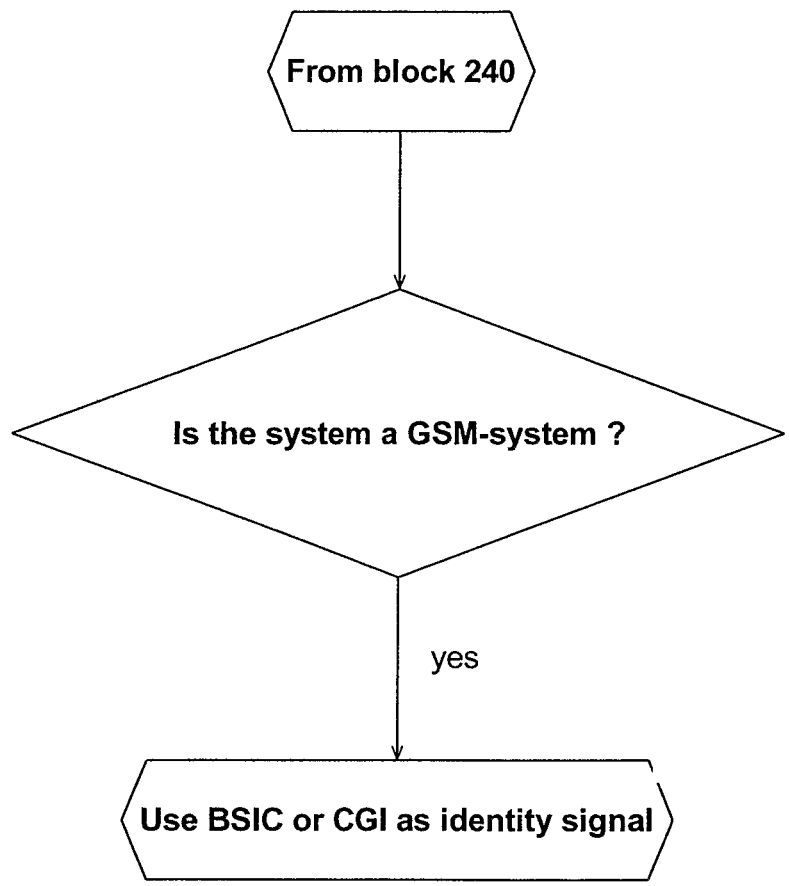
FIGS. 3 and 4 show alternative steps for the flowchart of FIG. 2.

These steps can be applied either to a GSM system, i.e. to a TDMA system, or to a CDMA system. As an example, if applied to a GSM system, the identity signal which is transmitted can be the so called CGI (Cell Global Identity) or the BSIC signals. This is outlined in FIG. 3.

Thus, control has been gained of some or all of the traffic of the targeted RBS, depending on the output power which is used for the transmissions by the temporary RBS. The next issue is to ensure that control is also maintained by the temporary RBS, which can be done in the following way: the user terminals whose traffic has been transferred to the temporary RBS will, as explained previously, listen to frequencies comprised in the candidate list of their current RBS, i.e. in this case the temporary RBS.

In order to maintain control of these user terminals the temporary RBS is, according to the invention, programmed to transmit a list of candidate frequencies, with the list being such that user terminals whose traffic has been transferred to the temporary RBS cannot find signals on any of the candidate frequencies in the vicinity of the cell of the targeted RBS, at least not with such a signal strength that they will appear as "attractive" candidates for a hand-over. Thus, there will be no "competing" frequencies to listen to, or at least to switch over to.

Figure 4:
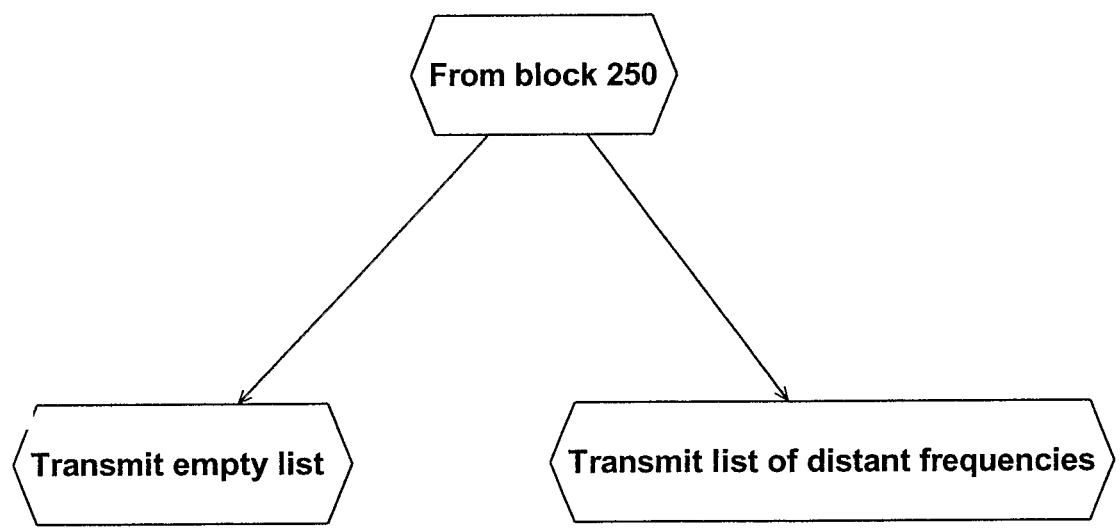

One way of achieving such a candidate list is to make the candidate list empty, or, as an alternative, the candidate list can comprise frequencies of RBS's which are known to be so distant that they cannot compete with the temporary RBS. These two alternatives are shown in FIG. 4.

This step of the invention can also be applied equally well to TDMA systems or CDMA systems. If applied to a GSM system, the candidate list will usually be the so called BA list.

Thus, by means of the invention, control of traffic to and from a targeted RBS has been gained by the temporary RBS and will be maintained by it, which was the object of the invention.

Figure 5:
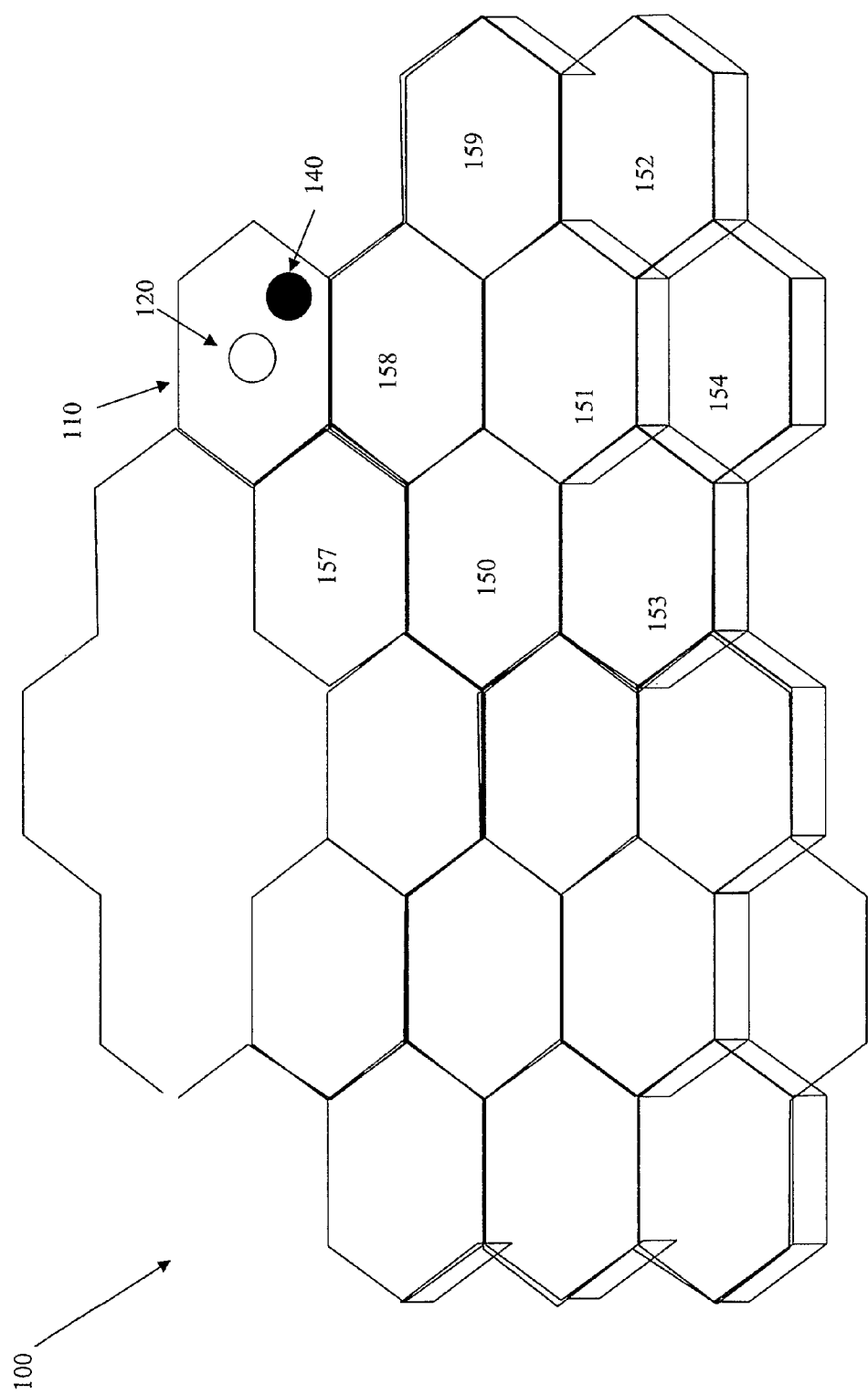
FIG. 5 shows a system in which the invention is applied.

Returning now to the positioning of the temporary RBS and to its programming regarding the frequency it will transmit on to gain control of traffic from the targeted RBS, and also to its candidate list, reference is made to FIG. 5.

In FIG. 5, the wireless cellular telecommunications system of FIG. 1 is shown again, with the targeted RBS denoted as 120, and the cell it controls being denoted as 110. The temporary RBS of the invention has been given the reference number 140.

As mentioned previously, the frequency which the temporary RBS 140 is made to transmit on is chosen from the candidate list of the targeted RBS 120. However, the frequency should not be chosen from one of those used by neighbouring cells or base stations, for examples the base station of the cell denoted as 157-159 in FIG. 5, since those base stations might provide the user terminals of the targeted RBS 120 with a strong signal.

Instead, the temporary RBS 140 should be programmed to transmit on a frequency which is in the candidate list of the targeted RBS 120, but which belongs to an RBS which is as remote as possible from the targeted RBS 120 while still being in the candidate list of the targeted RBS 120. The word "remote" in this context can be taken to mean either geographically or as an indicator of the strength of the signal from that RBS in the cell 110. One example of a suitable such radio base stations is the one denoted by 151 in FIG. 5. However, if made necessary, by for example, frequency planning and reuse, the temporary base station might have to "borrow" frequency and identity from a neighbouring RBS 157-159.

The invention is not limited to the examples of embodiments shown in the drawings and described above, but may freely be varied within the scope of the appended claims.

The invention claimed is:

1. A method for letting an extra base station gain and maintain control of traffic to and from a targeted radio base station (RBS) in a wireless cellular telecommunications system, said system comprising a plurality of RBS's for routing traffic to and from user terminals in the system, each RBS controlling the traffic to and from a certain cell within the system, where at least a number of said plurality of RBS's in the system each transmits an identity signal and a list of candidate frequencies for use by user terminals when switching RBS, the method comprising:
    positioning said extra base station in or adjacent to the cell of the targeted RBS, the extra base station comprising a temporary base station which is only temporarily a part of, but otherwise is separate from the wireless cellular telecommunications system,
    programming the extra base station to transmit on one of the frequencies in the candidate list broadcast by the targeted RBS,
    making the transmissions of the extra base station with such a power level that traffic to and from user terminals in the cell of the targeted RBS will be transferred to the extra base station,
    programming the extra base station to transmit an identity signal which is the same as that of the RBS whose frequency the extra base station transmits on,
    programming said extra base station to transmit a list of candidate frequencies, the list being such that user terminals whose traffic has been transferred to the extra base station cannot find signals with a strength at or above a pre-defined level for a certain pre-defined amount of time on any of the candidate frequencies in the vicinity of the cell of the targeted RBS.

2. The method of claim 1, according to which the frequency on which the extra base station is programmed to transmit on is a frequency used by an RBS which is not immediately adjacent to the cell of the targeted RBS.

3. The method of claim 1, according to which the list of candidate frequencies is empty, by virtue of which the candidate frequencies cannot be found.

4. The method of claim 1, applied to a Time Division Multiple Access (TDMA) system.

5. The method of claim 1, applied to a Code Division Multiple Access (CDMA) system.

6. The method of claim 4, applied to a Global System for Mobile Communications (GSM) system.

7. The method of claim 6, according to which the identity signal is the Cell Global Identity (CGI).

8. The method of claim 6, according to which the identity signal is the Base Station Identity Code (BSIC).

9. The method of claim 6, according to which the list of candidate frequencies is the Broadcast Control Channel Allocation list (BA-list).

10. An extra base station which can gain and maintain control of the traffic to and from a targeted radio base station (RBS) in a wireless cellular telecommunications system, said system comprising a plurality of RBS's for routing traffic to and from user terminals in the system, each RBS controlling the traffic to and from a certain cell within the system, where at least a number of said plurality of RBS's in the system each transmits an identity signal and a list of candidate frequencies for use by user terminals when switching RBS, the extra base station:
   positioned in or adjacent to a cell of the targeted RBS, and comprising a temporary base station, which is only temporarily a part of, but otherwise is separate from, the wireless cellular telecommunications system,
   programmed to transmit on one of the frequencies in the candidate list broadcast by the targeted RBS,
   transmitting with such a power level that traffic to and from users in the cell of the targeted RBS will be transferred to the extra base station,
   programmed to transmit an identity signal which is the same as that of the RBS whose frequency the extra base station transmits on,
   programmed to transmit a list of candidate frequencies, the list being such that user terminals whose traffic has been transferred to the extra base station cannot find signals with a strength at or above a pre-defined level for a certain pre-defined amount of time on any of the candidate frequencies in the vicinity of the cell of the targeted RBS.

11. The extra base station of claim 10, in which the list of candidate frequencies can be made empty, by virtue of which the candidate frequencies cannot be found.

12. The extra base station of claim 10, being an extra base station for use in a Time Division Multiple Access (TDMA) system.

13. The extra base station of claim 10, being an extra base station for use in a Code Division Multiple Access (CDMA) system.

14. The extra base station of claim 12, being an extra base station for use in a Global System for Mobile Communications (GSM) system.

15. The extra base station of claim 14, according to which the identity signal is the Cell Global Identity (CGI).

16. The extra base station of claim 14, according to which the identity signal is the Base Station Identity Code (BSIC).

17. The extra base station of claim 14, according to which the list of candidate frequencies is the Broadcast Control Channel Allocation list (BA-list).

* * * * *

UNITED STATES PATENT AND TRADEMARK OFFICE
CERTIFICATE OF CORRECTION

PATENT NO.         : 9,167,503 B2  
APPLICATION NO.    : 13/056182  
DATED              : October 20, 2015  
INVENTOR(S)        : Lagerman Page 1 of 1

It is certified that error appears in the above-identified patent and that said Letters Patent is hereby corrected as shown below:

In the Specification

In Column 3, Lines 46-47, delete "cell 120" and insert -- cell 110 --, therefor.

Signed and Sealed this  
Twenty-second Day of March, 2016

Michelle K. Lee  
*Director of the United States Patent and Trademark Office*